(12) United States Patent
Gresch

(10) Patent No.: US 10,901,408 B2
(45) Date of Patent: Jan. 26, 2021

(54) SYSTEM FOR MONITORING FUNCTIONS OF A WORK MACHINE

(71) Applicant: Deere & Company, Moline, IL (US)

(72) Inventor: Valentin Gresch, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/430,986

(22) Filed: Feb. 27, 2017

(65) Prior Publication Data

US 2017/0261978 A1    Sep. 14, 2017

(30) Foreign Application Priority Data

Mar. 8, 2016    (DE) .......................... 10 2016 203 715

(51) Int. Cl.
*G05D 1/00* (2006.01)
*G06Q 30/06* (2012.01)
(Continued)

(52) U.S. Cl.
CPC ......... *G05D 1/0016* (2013.01); *A01B 69/008* (2013.01); *B60R 25/2081* (2013.01);
(Continued)

(58) Field of Classification Search
CPC .. A01B 69/008; G05D 1/0016; G05D 1/0077; G05D 2201/0201; G07C 5/08;
(Continued)

(56) References Cited

U.S. PATENT DOCUMENTS

| 4,578,768 A | * | 3/1986 | Racine ................... G06F 3/033 |
| | | | 178/18.03 |
| 6,538,557 B1 | * | 3/2003 | Giessl ..................... B60R 25/24 |
| | | | 340/12.5 |

(Continued)

FOREIGN PATENT DOCUMENTS

| DE | 19714556 A1 | 10/1998 |
| DE | 19913971 A1 | 9/2000 |

(Continued)

OTHER PUBLICATIONS

Search Report issued in counterpart application No. EP17159628.1, dated Aug. 8, 2017 (8 pages).

*Primary Examiner* — Angelina Shudy

(57) ABSTRACT

A system for monitoring functions of a work machine. The system comprises an electronically readable identifier associated with an operator of the work machine. A user interface operable by the operator. A processor communicatively coupled to the user interface. At least one control device, wherein the at least one control device is configured to control operations of the work machine or an implement coupled to the work machine in response to receipt of an output signal generated by the processor. The processor is configured to execute a set of instructions stored on a memory such that when executed the processor is programmed to: read out the electronically readable identifier and obtain, via the user interface, an input selection of a desired device function assigned in an authorization database to the electronically readable identifier and to activate a desired function for a limited time duration that is defined or that is specified by means of the user interface.

9 Claims, 3 Drawing Sheets

(51) Int. Cl.
  *G07F 17/00* (2006.01)
  *B60R 25/24* (2013.01)
  *B60R 25/20* (2013.01)
  *G06Q 50/02* (2012.01)
  *A01B 69/04* (2006.01)
  *G07C 5/08* (2006.01)

(52) U.S. Cl.
  CPC ............ *B60R 25/24* (2013.01); *B60R 25/241* (2013.01); *G05D 1/0077* (2013.01); *G06Q 30/0645* (2013.01); *G06Q 50/02* (2013.01); *G07C 5/08* (2013.01); *G07F 17/0057* (2013.01); *B60R 2325/308* (2013.01); *G05D 2201/0201* (2013.01); *G07C 2209/04* (2013.01)

(58) Field of Classification Search
  CPC .......... G07C 2209/04; B60R 2325/308; B60R 25/2081; B60R 25/24; B60R 25/241; G06Q 30/0645; G07F 17/0057
  USPC ............................................................ 701/2
  See application file for complete search history.

(56) References Cited

U.S. PATENT DOCUMENTS

| | | | |
|---|---|---|---|
| 6,998,956 B2 | 2/2006 | Dix | |
| 8,190,335 B2* | 5/2012 | Vik | G07C 5/008 701/50 |
| 8,655,505 B2* | 2/2014 | Sprock | E02F 9/2054 701/2 |
| 8,688,332 B2* | 4/2014 | Reiners | E02F 9/261 701/50 |
| 8,749,345 B2* | 6/2014 | Thompson | B60R 25/042 307/10.2 |
| 9,002,536 B2* | 4/2015 | Hatton | B60R 25/24 340/426.13 |
| 9,082,095 B2* | 7/2015 | Duff | G06Q 10/063114 |
| 9,761,067 B2* | 9/2017 | Plante | G07C 5/085 |
| 2002/0082842 A1* | 6/2002 | Viaud | E02F 9/2004 704/275 |
| 2005/0085973 A1* | 4/2005 | Furem | E02F 9/2054 701/50 |
| 2011/0130893 A1* | 6/2011 | Gilleland | B60R 25/24 701/2 |
| 2011/0137489 A1* | 6/2011 | Gilleland | B60R 25/24 701/2 |
| 2012/0323772 A1* | 12/2012 | Michael | G06Q 40/00 705/39 |
| 2014/0277837 A1* | 9/2014 | Hatton | B60R 25/24 701/2 |
| 2014/0280061 A1* | 9/2014 | Elkhou | G06F 16/93 707/722 |
| 2014/0365256 A1* | 12/2014 | Duff | G06Q 10/063114 705/7.15 |
| 2015/0025753 A1* | 1/2015 | Mori | E02F 9/2066 701/50 |
| 2015/0178134 A1* | 6/2015 | Dai | G06Q 10/0631 718/104 |
| 2015/0286636 A1* | 10/2015 | Elkhou | G06Q 50/18 707/722 |
| 2016/0071410 A1* | 3/2016 | Rupp | H04W 4/70 701/50 |
| 2017/0096123 A1* | 4/2017 | Gennermann | B60R 25/241 |
| 2017/0261978 A1* | 9/2017 | Gresch | G05D 1/0016 |
| 2017/0323494 A1* | 11/2017 | Plante | G07C 5/085 |
| 2017/0347266 A1* | 11/2017 | Petel | H04W 12/06 |
| 2018/0084723 A1* | 3/2018 | Gresch | A01B 67/00 |
| 2020/0118222 A1* | 4/2020 | Bidram | G06Q 10/06393 |

FOREIGN PATENT DOCUMENTS

| | | |
|---|---|---|
| EP | 1583041 A1 | 10/2005 |
| EP | 2144206 A1 | 1/2010 |
| EP | 3216659 A1 | 9/2017 |
| WO | 2015176826 A1 | 11/2015 |

* cited by examiner

| Automatic steering system | ✓ |
|---|---|
| Contact pressure regulation | ☐ |
| Duration | 5h |
| Total costs | $14.73 |

SYSTEM FOR MONITORING FUNCTIONS OF A WORK MACHINE

RELATED APPLICATION

This application claims priority to German Application No. 102016203715.3, titled "Arrangement for Monitoring Functions of a Work Machine," filed Mar. 8, 2016, which is hereby incorporated by reference in its entirety.

TECHNICAL FIELD

The present disclosure relates to a system for monitoring the activation of functions of a work machine.

BACKGROUND

In the past, work machines, particularly those for agriculture, have been provided with ever more complex functions such as automatic steering systems, headland management or location-specific controls of attachments. This trend will also continue in the future.

Most of these functions rely on software. In the prior art, this software has already been installed in the work machine when delivered or is installed subsequently and can be activated without further actions, so that every user who has a key for the work machine can also use the software, independently of whether he has appropriate instruction or training. One example of such software would be headland management for a tractor.

Some types of software for work machines provide an additional, temporary activation by the software supplier. Such software typically uses external resources subject to payment, such as data networks or satellites. To activate the software according to the current state of the art, the user of the work machine fills out a form and sends it to the supplier by mail or fax. After transferring a specified amount of money, the user of the work machine receives a password that he can input into the user interface of the work machine in order to be able to use the desired software. The usage duration of the software can be selected in the form and limited to periods of one or more months, so that this process must be repeated after the time expires. An activation of special software and the associated function for a special machine can be accomplished in this way. This therefore involves a monetary payment for functions even if they are not wanted because the software that must be activated in return for payment (e.g., plant condition-controlled actuation of a fertilizer machine) is certainly not necessary for all working processes of the work machine. If the software is to be used on a different machine, a second activation in return for payment is necessary.

It has also been proposed to assign individual keys equipped with associated electronic identifiers to the users of work machines. The possessor of the key has access to all the machines for which he is authorized. When the key is inserted into the ignition of the work machine, the machine's local processor detects the identifier and transmits it to a central processor. Based on the identifier, the central processor reads an authorization assignment table and transmits the authorizations assigned to the owner of the key to the local processor. This makes it possible for the possessor of the key to have access to the functions of the machine corresponding to his authorization. In this way, a driver without a license for the machine can be authorized only to drive, or a mechanic without a driver's license can be authorized only for a maintenance operation. In addition, user-specific settings of the machine can be retrieved based on the identifier and usage information for the machine and transmitted to the central processor so that it can prepare invoices for the work done. The authorization assignment table is maintained by an operating station at the central processor. Therefore, if a new driver takes a position with a contractor, the driver would be issued a key with the associated identifier and the authorization assignment table at the operating station would be updated. The activation is valid for an indefinite time, until the authorization assignment table is updated due to changes of employment or the like and the authorization of the driver is changed or revoked. This therefore requires a relatively large effort, namely contacting the operating station, in order to change authorizations. Quickly changing the functions permitted to a driver is not possible.

SUMMARY

Embodiments herein disclose a system for monitoring functions of a work machine, the system comprising: an electronically readable identifier associated with an operator of the work machine; a user interface operable by the operator; a processor communicatively coupled to the user interface; and at least one control device, wherein the at least one control device is configured to control operations of the work machine or an implement coupled to the work machine in response to receipt of an output signal generated by the processor; wherein the processor is configured to execute a set of instructions stored on a memory such that when executed the processor is programmed to: read out the electronically readable identifier and obtain, via the user interface, an input selection of a desired device function assigned in an authorization database to the electronically readable identifier and to activate a desired function for a limited time duration that is defined or that is specified by means of the user interface.

BRIEF DESCRIPTION OF THE DRAWINGS

FIG. 3 is an exemplary depiction of a display device for selecting functions of the work machine.

Like reference numerals are used to indicate like elements throughout the several figures.

DETAILED DESCRIPTION

Figure 1:
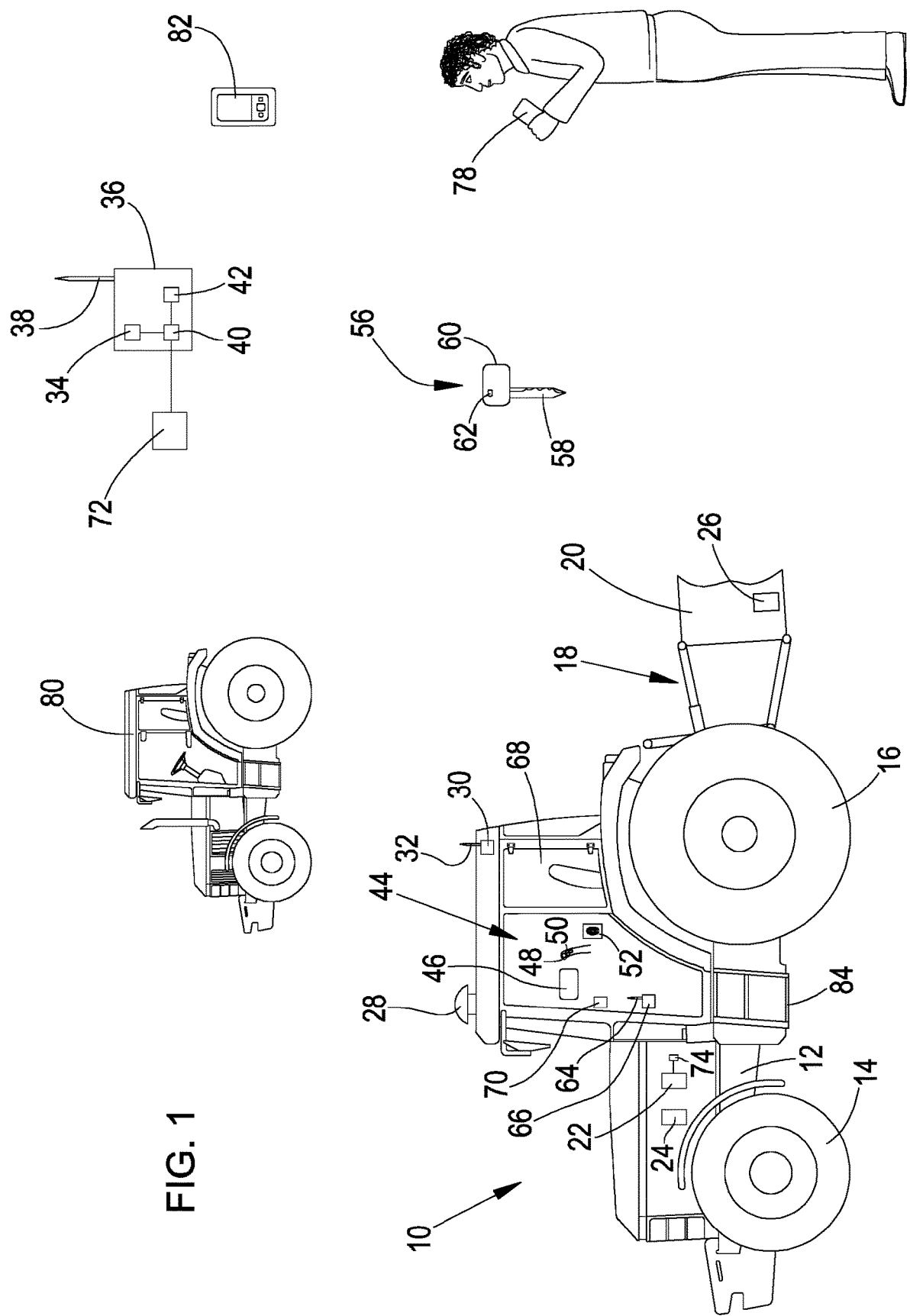
FIG. 1 is a schematic representation of a system for controlling the activation of functions of a work machine.

Embodiments described herein relate to an arrangement for monitoring functions of a work machine comprises an identification means that can be read (out) electronically and is assigned to a user of the work machine, a user interface operable by the user, a processor that is or can be coupled to the user interface, and at least one device of the work machine and/or an implement associated with the work machine, the functions of which can be switched on and off by the processor. The processor is programmed to read out the identification means and obtain an input and/or selection of a desired function of the device via the user interface. If an authorization associated with the identification means for using (and thus activating) a function of the device on the working machine and/or the implement is entered in a stored authorization data table, the processor activates an input and/or a selected, desired function of the device for a period of time that is limited, defined or specifiable by means of the user interface, and therefore the desired function can subsequently be used by the user. The user can be offered only the functions assigned to him according to the authorization database, or also more extensive functions. In the second case, there is a check after the selection as to whether there is an authorization for the function.

In other words, the user identifies himself to the processor of the work machine by using the identification means. Based on the authorization database, there is a check as to whether the operator is authorized to use one or more defined functions of at least one device on the operating machine and/or the implement. If that is the case, the user can select or input by means of the user interface the assigned function(s) of the work machine and/or the apparatus that he would like to use. The processor then activates this function and the user can use it. In this manner, there is a temporary activation only for actually required functions for a certain fixed or input time duration, which can be hours, half-days or full days, for example.

Based on the activation, the functions actually used or made available can be accounted for more accurately than in the previously customary long-term activation of software. This procedure is suitable, for example, if the work machine is not owned by the possessor or operator but is only rented from a provider (e.g. lessor or dealer), because then the lessor, as the operator of the central computer and the maintainer of the authorization database, can offer the machine at a relatively low price and bill the actual usage more appropriately. The same applies if the operator or possessor has bought the machine, because then the manufacturer or dealer, as the operator of the central computer and maintainer of the authorization database, can sell the machine at a relatively lower base price and later receive additional compensation adjusted for the actual usage.

The authorization database is preferably stored on a central computer, which is remote from the work machine and has a wireless bidirectional communication link with the processor. The processor can be coupled to a local memory on which a local copy of the authorization database is stored. The authorization assigned to the identification means can be read out of the authorization database by the central computer or by the processor, particularly in case a communications link is temporarily not available (e.g. when the work machine is in a region without wireless access). The processor then accesses the local copy of the authorization database, which is updated from time to time, particularly when the communications link is again available. It is also conceivable for this local copy of the authorization database, or at least the data thereof relating to the operator, to be stored (in a form verifiable by the processor, e.g. furnished with an electronic authenticity certificate) on a storage medium permanently coupled to the electronic identification means. Thus the operator can use the functions that can be enabled for him even if he first logged into the work machine at a location where no communication with the central computer is available.

The processor can be programmed to transmit a data record regarding the selected functions, and optionally the specified time duration, to the central computer, and the central computer can be programmed to create accounting data for the selected activation based on the received data record. This billing data can be sent, monthly for example, to the operator or possessor of the work machine as an invoice, or it can be directly deducted from any account (e.g. bank account, credit card or PayPal) desired by the user or possessor of the work machine. Different authorization levels can be stored in the authorization database, wherein the first authorization level authorizes the user to activate one or more or all available functions of the work machine directly (i.e. without additional verification by an external office), and a second authorization level authorizes the operator only to transmit a query regarding a desired function that has been input and/or selected by the operator to a remote input and output device via the processor and/or central computer, and the processor is programmed to activate the desired function only after a positive answer has been input at the remote input and output device. The remote input and output device is managed by an authorized party, e.g. an operation manager or supervisor of the operator. The first authorization level can be assigned to experienced, reliable operators of the work machine, who can activate functions assigned to them without an inquiry or review. The second authorization level can be assigned to less experienced operators such as temporary help or trainees, for whom the desired activations must be carefully reviewed. Combinations are also conceivable in which the first authorization level is assigned to a special user for some functions and the second authorization for other functions.

A second processor, which is or can be coupled to a user interface and the central computer, can be assigned to a second work machine, so that a function activated on the first work machine can also be usable on the second work machine by means of the identification means. In this case, the activation performed on the (first) work machine can be transmitted via the central computer to the second work machine and deactivated on the first work machine. This procedure is suitable in the event that the first work machine fails. In another embodiment, the activation remains limited to the first work machine on which it has taken place. If one operator is absent (e.g. due to illness), it can also be possible for the activated function to be canceled or transferred to a different operator. For this purpose, the first operator (or the second one replacing him) can make an appropriate input into the user interface if necessary.

It can be possible for an authorized person to modify the authorization database after inputting an authorization using remote communication means, particularly a mobile phone or Internet connection. It is accordingly defined who is authorized to modify the authorization database. This can be the operations manager of a (contract) agricultural company, for example. In this manner, new employees can use functions of the company's work machines relatively simply and quickly. The authorized person can also make other modifications of the authorization database, e.g. deletion of authorizations or assignment of new functions to certain operators.

The activatable function of the work machine can be one or more of the following: automated steering of the work machine based on a satellite-assisted navigation system with or without correction signal; automated steering of the work machine by means of a sensor-detected path; synchronization of position and movement paths of multiple work machines; position-based actuation of functions of the work machine and/or the implement at the headland; tractor-implement automation (e.g. according to the ISO 11783 standard) according to which the implement controls one or more functions of the tractor; variable application rates; row synchronization (i.e. a sowing machine is controlled such that the seed transverse to the travel direction is oriented in a crossover and in a predetermined pattern with already output seed); accessibility of physical or electronic user and/or repair manuals; authorization for online ordering of operating materials and/or spare parts for the work machine via the user interface; switching to partial widths or single rows based on maps and information regarding the vehicle and/or implement position; access to lockable containers on the work machine; maximum travel speed of the work machine in the field and/or on the road; geographical usage range of the work machine; available engine power of the work machine; starting the engine of the work machine; driving the work machine; user-specific configuration of operating elements and/or the workplace in the work machine (e.g. seat adjustment); switching on an air conditioner; switching on entertainment electronics onboard the work machine; and/or switching communication means of the work machine and/or the implement that allow actuation or activation of a stationary unit, e.g. opening and closing a gate or activating operation of a fueling pump; and/or conceding an authorization of the identification means for actuating a stationary device (particularly those previously mentioned).

The electronically readable identification means can be one or more of the following: memory chip, a physical feature of the operator such as his face, fingerprint or retina, a password that can be input into the user interface and/or a password stored on a portable terminal device or other data stored there, such as its serial number.

Referring to FIG. 1, a work machine 10, which, for exemplary purposes, is shown in the form of a tractor mounted on a chassis 12 that is supported on the ground by front steerable wheels 14 and rear driven wheels 16. An implement 20 at the rear of the chassis 12 is coupled to the work machine 10 through an implement interface 18.

The work machine 10 comprises a vehicle processor 22 that enables the activation of certain functions of the work machine 10 and/or the implement 20, i.e. to make operation thereof possible or impossible. For example, these can be functions of an automated steering system having an associated control device 24 that receives signals from a satellite receiver 28 and steers the front wheels 14 along a planned path, or can be functions of the implement 20 controlled by a controller 26 of the implement 20, such as an intelligent control of the contact pressure of a cultivating implement.

The vehicle processor 22 can be communicatively coupled to a vehicle transmitting and receiving device 30 that is equipped with an antenna 32. The vehicle transmitting and receiving device 30 enables wireless electronic communication with a remote transmitting and receiving device 34 of a remote station 36. The remote transmitting and receiving device 34 is communicatively coupled to a central computer 40, on which an authorization database 42 is stored.

The vehicle processor 22 is additionally coupled to a user interface 44 that comprises a display device 46 and input elements in the form of a joystick 48 with buttons 50 and a fingerprint sensor 52.

As depicted in FIG. 1, a user can be assigned a key 56 that contains a housing 60 comprising a key bit 58 and an electronic identification means 62 in the form of a transponder chip embedded in the housing 60. The work machine 10 is in turn provided with a vehicle transmitter and receiver 66, which is coupled to the vehicle processor 22 and to an antenna 64 that can communicate with (i.e., transmit data signals to and from) the identification means 62 of the key 56 when the key is in the cab 68 of the work machine 10, more particularly in an ignition switch 70 therein. A local copy of the authorization database 42 is stored in a memory 74 coupled to the vehicle processor 22 and is updated at regular intervals on the basis of the authorization database via the vehicle transmitting and receiving device 30 and the remote transmitting and receiving device 34.

Figure 2:
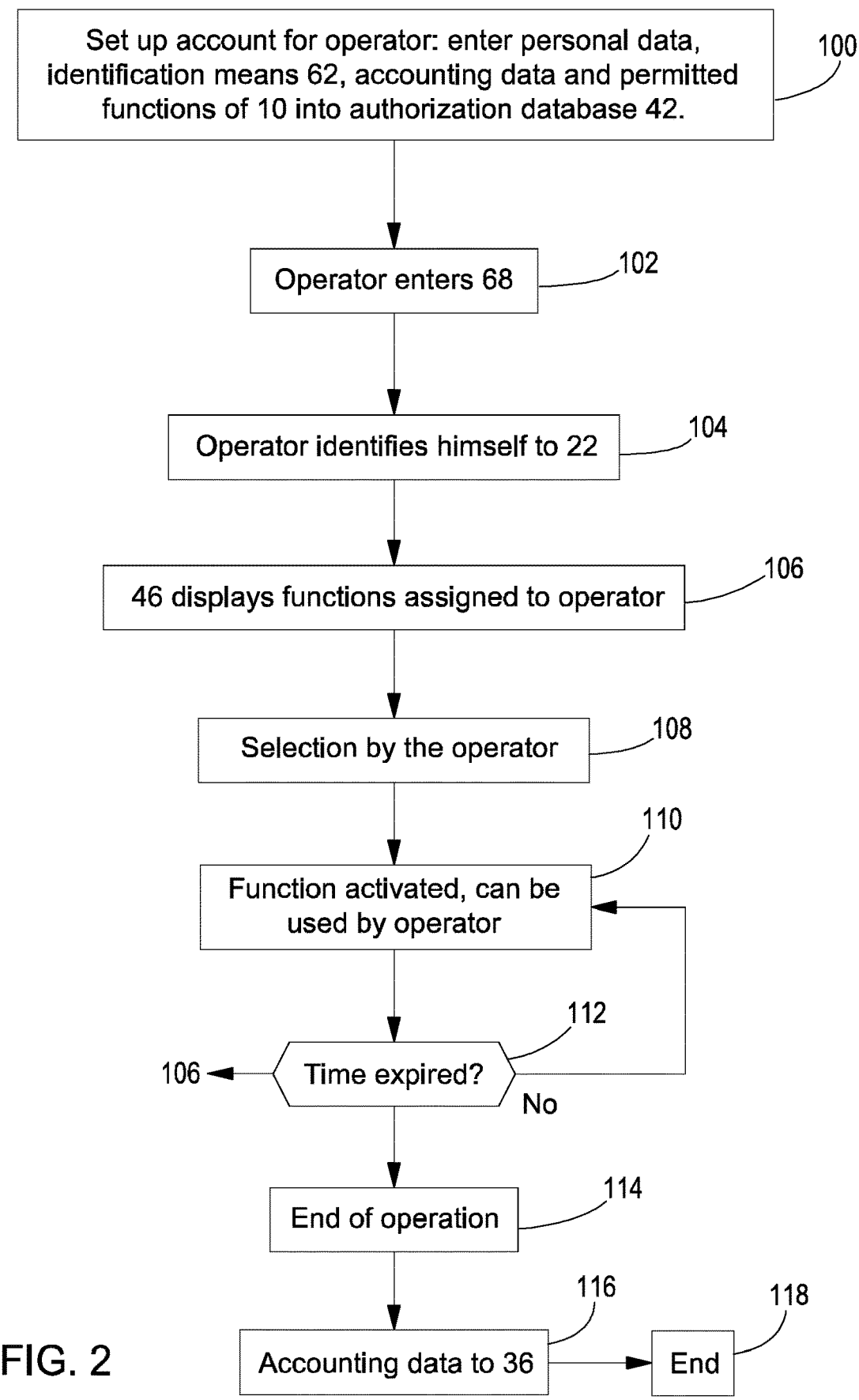
FIG. 2 is a flow chart of a method for controlling the activation of functions of a work machine.

In operation, and referring now to FIG. 2, at step 100, an account is set up for the operator in the authorization database 42 and contains personal data (name, address, etc.), data regarding the identification means 62 (such as a serial number of the identification means 62 or a unique password stored thereon) that allow identification of the operator, billing data (e.g. invoice address or account number) and the authorizations conceded to a specific user. This account setup can be done locally at the remote station 36 by means of an input station 72, in that the operator or a person authorized for the work machine 10 arrives there or transmits a filled-out form via mail, fax or email to the remote station 36, where the authorization database 42 is maintained at the input station 36 by an employee. Online setup of the account via an Internet connection by the operator or an authorized person for the work machine 10 is also conceivable. In each case, means can be provided for checking the authorization of the person initiating the registration or modification in the authorization database 42. For that purpose, a password, which the authorized person must input in order to be able to modify the authorization database, can be assigned to each work machine 10.

Once the account has been set up, the operator (i.e., vehicle operator) can go to the work machine 10 with the key 56 and can open a door of the cab 68 with the key bit 58, or can use the vehicle processor 22 that is in communication with the identification means 62 via the vehicle transmitter and receiver 66 in any desired physical manner (e.g. radio waves, near field communication, infrared) and via any desired protocol (e.g. Bluetooth, WLAN or telephony protocol), and can enter the cab 68 (step 102). The vehicle processor 22 can access the local copy of the authorization database in the memory 74, or the authorization database 42 if the communications link is present. The vehicle transmitter and receiver 66 are preferably located at one or more of the following positions: at an entryway 84 to the cab 68, in the cab 68, on a toolbox and/or a compartment, in which documents (such as vehicle papers) are stored. Once a user account has been setup at step 100, the operator may utilize the account information at 102 to allow the user to reuse the work machine 10.

Next at step 104, the operator is identified with respect to the vehicle processor 22 when he has opened the door by using the identification means 62 or identifies himself by the identification means 62 communicating with the vehicle transmitter and receiver 66. Alternatively or additionally, the operator can identify himself by the fingerprint sensor 52, for which data regarding the fingerprint has been entered into the authorization database 42 and the local copy in the memory 74.

After the ignition of the work machine 10 has been switched on, step 106 follows, in which the vehicle processor 22, using the display device 46, displays the user-activatable functions assigned to the operator who has been identified to the vehicle processor 22. These functions are retrieved from the local copy of the authorization database in the memory 74, or if the communication connection is available, from the authorization database 42. In the present embodiment, this can involve the above-mentioned functions of the automatic steering system (control device 24) and the contact pressure regulation of the implement 20. The operator can move a cursor 76 (see FIG. 3) to the displayed functions via the input elements of the user interface 44, i.e. the joystick 48, and can select or deselect the displayed functions with buttons 50. He can also optionally input or select the time duration for which these functions should be available. The associated prices for using the functions are displayed to him; see FIG. 3, in which the automatic steering system has been selected (check mark set) and the contact pressure regulation has not been selected (check mark not set) and the input usage period (5 hours) and associated costs are displayed. After a further confirmation, one or more functions is or are selected and the remaining functions are deselected at step 108.

The operator or another authorized person can (if a corresponding authorization was conceded to him in the authorization database 42) book additional functions if needed (i.e. enable activation thereof) as explained above for step 100. The input elements of the user interface 44 for the work machine 10 can be used for this if applicable.

Next, at step 110, the operator can use only the selected functions (step 110) until the specified time has elapsed at step 112, at which point control returns to step 106.

If the operation of the work machine 10 has been finally completed, however, for which the corresponding input or confirmation by the operator can be given by means of the input elements of the user interface 44 at step 114, the vehicle processor 22 sends accounting data (i.e. the selected function and time duration and/or the costs incurred for using the functions) to the central station 36, which debits the account of the user 54, stored in the authorization database 42, at regular intervals on the basis of this accounting data. This can also be the account of the owner of the work machine 10. The process ends at step 118.

In other embodiments, instead of displaying only the functions assigned to the user 54, all available functions of the work machine 10 could be displayed at step 106. In such an embodiment, there would be a check following step 108, on the basis of the authorization database 62 or the local copy thereof in the memory 74, as to whether the operator has chosen a function available to him or not. If a function is unavailable to the operator, an error message would be displayed on the display device 46 and control would return to step 106. In order to avoid such errors, the functions not available to the operator could be displayed in step 106, but specially marked, e.g. grayed out.

The operator or another authorized person can (if a corresponding authorization was conceded to him in the authorization database 42) book additional functions if needed (i.e. enable activation thereof) as explained above for step 100. The input elements of the user interface 44 for the work machine 10 can be used for this if applicable.

Instead of using the identification means 62 in the key 56 and/or identification by using the fingerprint sensor 52 (or in addition thereto), the operator could be assigned a mobile terminal device 78 (e.g. a mobile telephone), the serial number of which is stored in the authorization database 42, as are any other desired unique data or software applications stored in a memory of the terminal device, and are read by the vehicle processor 22 and compared to the authorization database 42 in order to identify the operator. This mobile telephone 78 could, if furnished with suitable means, also serve as a user interface 44 with display device 46 and input element for the vehicle processor 22. In yet another embodiment, the operator is assigned a unique password in the authorization database 42, which he can input into the vehicle processor 22 with an input element of the user interface 44.

Based on the identified operator, the vehicle processor 22 can also configure or adjust certain operating elements and the seat in the cab 68 user-specifically, based on the data from the authorization database 42. Any changes made are recorded and returned to the authorization database 42 in order to be able to use them on a second work machine 80.

It would also be conceivable to assign the operator a first or second authorization level. For the first authorization level, the process would be as described in FIG. 2, whereas the second authorization level provides that a selected function must further be confirmed by a remote terminal device 82.

Usage authorization for the activated function can also extend to the second work machine 80, if the operator identifies himself to the processor thereof within the specified period of time. However, the function is then switched off on the first work machine 10.

The authorizations of the operator to use specified functions can be limited to all work machines of a machine fleet or to work machines 10, 80 defined in the authorization database 42. The geographical usage range of the work machines 10, 80 can also be limited for the assigned operator. The maximum road speed of the work machine 10 can also be specified by the authorization database, particularly depending on the driver's license class of the operator. The vehicle processor 22 need not be on board the work machine 10, but can instead be arranged on the implement 20 or at a distance from the implement 20 and the work machine 10 and can communicate therewith via the communication means. For example, the processor 20 could be integrated into the central computer 40 and communicate via the transmitting and receiving devices 30 and 34 with the equipment located on the work machine 10 or on the implement.

Finally, it should be noted that certain functionalities can be assigned to the identification means 62 in the authorization database 42, which activates the vehicle processor 22 without the operator having to perform an activation via the user interface 44. These can be functions that are required by default for operating the work machine 10, such as harvesting units on self-propelled harvesting machines, but which should not be available to certain operators such as personnel authorized only for driving. The respective availabilities of the functions (always available or first or second authorization level) for the operator could also be defined specifically to the order in the authorization database 42.

Without in any way limiting the scope, interpretation, or application of the claims appearing below, a technical effect of one or more of the example embodiments disclosed herein is an arrangement for monitoring functions of a work machine. While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A system for monitoring functions of a work machine, the system comprising:

an electronically readable identifier assigned to an operator of the work machine, the electronically readable identifier having an identification number associated therewith;

a first controller configured to generate a first output signal to control a work function associated with the work machine in response to receipt of a first enablement signal;

a second controller configured to generate a second output signal to control an agricultural implement coupled to the work machine in response to receipt of a second enablement signal; and a processor configured to execute a set of instructions stored on a memory to:

generate the first enablement signal or the second enablement signal to activate at least one of the first controller or the second controller based on the work function associated with the identification number from an authorization database and a selected work function, and wherein the first controller or the second controller is configured to cause the selected work function to be performed; and transmit a data record corresponding to associated costs of the selected work function to a central computer, the data record to cause the central computer to generate billing data for the selected work function based on of the data record.

2. The system of claim 1, wherein the authorization database is stored on the central computer located remotely from the work machine and is configured to communicate with the processor via a wireless bidirectional communication link.

3. The system of claim 2, wherein the processor is coupled to a local memory on which a local copy of the authorization database is stored.

4. The system of claim 1, wherein an authorization assigned to the identification number associated with the electronically readable identifier is retrieved from the authorization database by the central computer if a communications connection is not available.

5. The system of claim 1, wherein different authorization levels are stored in the authorization database, wherein a first authorization level authorizes the operator to activate one or more of a plurality of work functions of the work machine, and a second authorization level authorizes the operator to transmit a query regarding the work function selected by the operator to a remote input and output device via the processor or the central computer, and wherein the processor is programmed to activate the work function after a response has been input at the remote input and output device.

6. The system of claim 1, wherein the work machine is a first work machine, the system further comprising a second processor assigned to a second work machine, wherein the second processor is configured to receive signal inputs from the first work machine such that the work function activated on the first work machine is transmitted to the second processor to allow for the work function to be performed the second work machine.

7. The system of claim 1, wherein the authorization database is modified by an authorized person after input of an authorization by using a remote communication connection comprising at least one of a mobile radio or an Internet connection.

8. The system of claim 1, wherein the work function of the work machine comprises at least one of: automated steering of the work machine based on a satellite-assisted navigation system with or without correction signal; automated steering of the work machine by means of a sensor-detected path; synchronization of position and movement path of a plurality of work machines; position based actuation of the work function at a headland; tractor-implement automation; variable application rates; row synchronization; accessibility of physical or electronic user or repair manuals; authorization for online ordering of operating materials or spare parts for the work machine via a user interface; switching to partial widths or single rows based on maps and information regarding the work machine or the agricultural implement position; access to lockable containers on the work machine; maximum travel speed of the work machine in a field or on a road; geographical usage range of the work machine; available engine power of the work machine; starting an engine of the work machine; driving the work machine; user-specific configuration of operating elements or a workplace in the work machine comprising switching on an air conditioner, switching on entertainment electronics onboard the work machine, or switching on communication means of the work machine or the agricultural implement that allow actuation or activation of a stationary unit; or determining an authorization level of the electronically readable identifier for actuating a stationary device.

9. The system of claim 1, wherein the electronically readable identifier comprises at least one of a memory chip, a physical feature of the operator, a password that can be input into a user interface or a password stored on a portable terminal device or other data stored on the electronically readable identifier.

* * * * *